Figure 1:
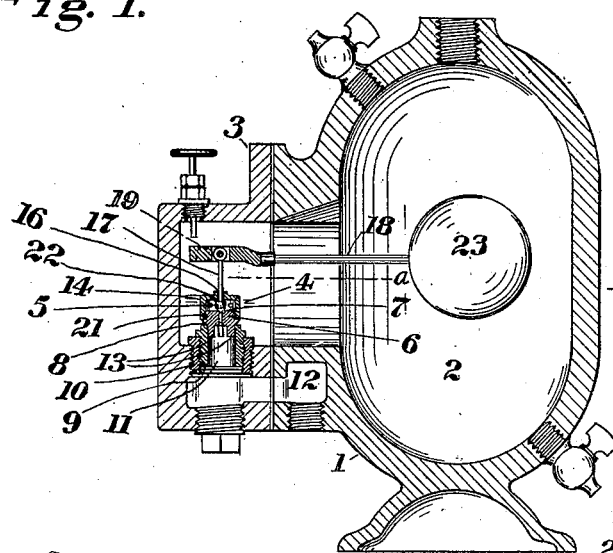

No. 843,019. PATENTED FEB. 5, 1907.
R. C. JOHNSTON.
STEAM TRAP.
APPLICATION FILED MAY 11, 1906.

Witnesses
Theodore C. Jung
Cordelia O'Hearn

Inventor
Robert C. Johnston,
by A. F. Herbslet,
Attorney.

THE NORRIS PETERS CO., WASHINGTON, D. C.

UNITED STATES PATENT OFFICE.

ROBERT C. JOHNSTON, OF NEWPORT, KENTUCKY.

STEAM-TRAP.

No. 843,019.　　　　　Specification of Letters Patent.　　　　　Patented Feb. 5, 1907.

Application filed May 11, 1906. Serial No. 316,353.

*To all whom it may concern:*

Be it known that I, ROBERT C. JOHNSTON, a citizen of the United States, residing at Newport, in the county of Campbell and State of Kentucky, have invented an Improvement in Steam-Traps, of which the following is a specification.

My invention relates to steam-traps, and has for its object the providing of a steam-trap so arranged that it is capable of acting to release the water of condensation irrespective of material variations in pressure to which the interior of the trap and its valve may be subjected; and it is the further object of my invention to so construct the trap as to take care of the flow of condensation therefrom, whether that flow be of small or great volume.

It has been the practice heretofore in the construction and installations of steam-traps to provide steam-traps arranged to permit the outflow of the water of condensation under the pressure to which the system of installation may ordinarily be subjected and to provide in the trap for the release of the volume of the water of condensation which may ordinarily accumulate in the system. The result has been that if the system installed were subjected to excessive internal pressure, either by reason of accident, carelessness, or by change in the plans thereof or the purpose to which it was applied, that the trap become "stalled" and refused to open, owing to excessive pressure on the valve. In other cases, the trap being constructed and installed for releasing given quantities of water within given times, the trap would refuse to take care of excessive quantities of water of condensation, thereby subjecting the system to detrimental conditions and causing improper operation of the trap.

It is the object of my invention to overcome these objections, and I overcome them in novel manner by means of a double valve comprising an initial valve of small area, which by reason of its small area cannot be subjected to excessive total pressure irrespective of the amount of pressure there may be in the trap and a subsequently operating larger valve of greater area arranged to afford a large opening through which a large volume of water of condensation may discharge. The small valve upon being opened relieves the pressure inside the trap, so as to substantially balance the larger valve, permitting the latter to be unseated with comparatively small power. In this manner I provide a small valve for relieving pressure and a large valve for relieving volume of water of condensation.

The invention will be more fully understood from the following description and claims, and from the drawings, in which latter—

Figure 3:
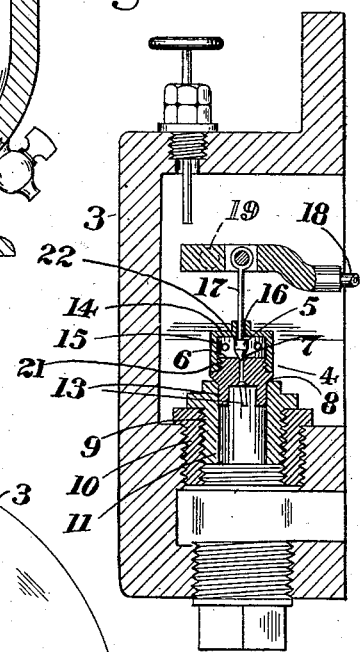
Figure 4:
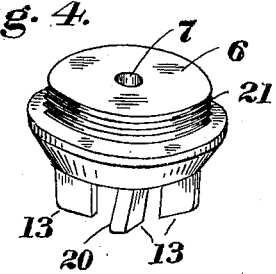
Figure 2:
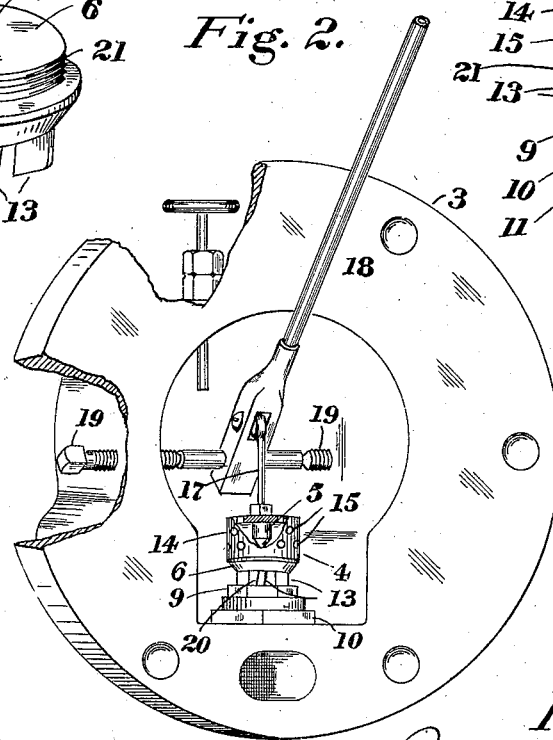

Figure 1 is a central vertical section of my improved device. Fig. 2 is a perspective view of the valves and their connections, partly broken away for better illustration of the parts and showing the valves unseated. Fig. 3 is an enlarged detail in central vertical section of the valves and their connections, and Fig. 4 is a perspective view of the follow-up valve.

I have shown my improved device in connection with a so-called "float-valve" style of trap, as shown and described, for instance, in Letters Patent No. 799,098, granted J. Smith, September 12, 1905, although it may also be employed in connection with a so-called "bucket" style of steam-trap, as well as in tilting and expansion traps.

1 represents the casing of the trap, which comprises a shell 2 and cap 3.

4 shows a composite valve comprising an initial valve 5 and a follow-up valve 6, the latter having a valve-seat 7 thereon with which the initial valve is adapted to engage. The cap is provided with a valve-seat 8 for the follow-up valve. This valve-seat is preferably on a thimble 9. The thimble is preferably screwed into an internally and externally threaded nipple 10, threaded into a suitable threaded bore of the casing, the bore 11 of the thimble communicating with the outlet-passage 12 of the trap. The follow-up valve is provided with wings 13, adapted to engage the inner wall of the bore 11 for guiding the follow-up valve.

14 is a shield provided with openings 15 for permitting the passage of water of condensation therethrough. This shield has an aperture 16, through which the stem 17 of the initial valve is adapted to take, the stem in the form shown being pivoted to a float-lever 18, in turn pivoted upon bolts 19, threaded into the cap of the casing. The stem 17 passes loosely through the aperture 16, thus permitting the follow-up valve when raised to loosely rest on the stem and initial valve, so as to allow the same to turn, and thus change the relative points of contact between both valves and their seats. To facilitate this turning, I construct the wings 13 with sideward flares or projections 20, against which the water of condensation takes for causing the follow-up valve to turn. The shield is secured to the follow-up valve, as by being threaded thereto, as shown at 21. The initial valve has a shoulder 22, adapted to engage the shield, and thereby raise the follow-up valve in the further movement of the initial valve. The parts are so arranged that when the float-lever has reached a given height, owing to the buoyancy of the ball 23 thereon, the initial valve will be raised from its seat, preferably with a snap movement, for relieving interior pressure in the trap, the shoulder 22 making engagement with the shield and in the further rise of the ball 22 unseating the follow-up valve from its seat. It is of course obvious that more than one follow-up valve may be provided, one lifting the other. There is preferably a water seal continually about both valve-seats, the valves seating when the water of condensation has, for instance, reached the level indicated by the dotted line a. It will be noted that the initial valve is of small area, its valve-seat also being of small area, so that no great power will have to be exerted upon the same for raising it from its seat, as it will be understood that the diameter of the opening in the valve-seat for the initial valve governs the area upon which pressure is exerted upon the initial valve, due to pressure in the trap for holding the same to its seat. It will be necessary to exert small power for unseating the same, and in my improved construction this unseating can be obtained irrespective of excessive pressures in the interior of the trap, the initial valve having the primary object of relieving that pressure.

As soon as the pressure is relieved comparatively small power is required to lift or unseat the follow-up valve from its seat, the primary object of the follow-up valve in my improved construction being to provide large opening through which excessive amounts of water of condensation may be discharged. In my improved construction, therefore, it is not necessary to provide traps of different capacities for different services, and my improved trap has the further advantage that its operation will not be detrimentally influenced by variations either accidental or intentional either in the pressure or in the volume of the water of condensation to be discharged. It further prevents the "stalling" of the steam-trap by reason of pressure being applied in the interior of the trap in excess of the lifting power of the valve, which takes care of the discharge of the volume of the water of condensation and further prevents the stalling of the trap by reason of excessive supply of water of condensation, the composite valve taking care of either or both of these abnormal conditions.

Having thus fully described my invention, what I claim as new, and desire to secure by Letters Patent, is—

1. In a steam-trap, the combination of an initial valve, a follow-up valve having a valve-seat thereon for said initial valve, a valve-seat for said follow-up valve, a perforated cap secured to said follow-up valve, said perforated cap having small side perforations surrounding said cap forming protecting-webs between said perforations throughout the side wall of said cap for permitting the passage of the water of condensation through said perforations and protecting said initial valve from foreign substances, said initial valve having a shoulder adapted to raise said cap, and thereby raise said follow-up valve, and means automatically operated by the water of condensation in said trap for unseating said initial valve and thereby relieving pressure from and unseating said follow-up valve, substantially as described.

2. In a steam-trap, the combination of an initial valve, a follow-up valve having a valve-seat thereon for said initial valve, said follow-up valve having a passage of relatively small diameter communicating with said valve-seat, a valve-seat for said follow-up valve having a passage of relatively large diameter communicating therewith, said follow-up valve having wings extending therefrom into said last-named passage, one or more of said wings being provided with a sideward deflection, a perforated cap secured to said follow-up valve, within which cap said initial valve is located, said perforated cap having small side perforations surrounding said cap forming protecting-webs between said perforations surrounding the side wall of said cap for permitting the passage of the water of condensation through said perforations and protecting said initial valve from foreign substances, and means extending through said cap from said initial valve, and means connecting with said latter means for automatically operating said initial valve from the water of condensation in said trap for relieving initial pressure from said follow-up valve and permitting said follow-up valve to be unseated against a pressure less than the ultimate pressure in said trap at the time of the unseating of said initial valve and causing said follow-up valve to be rotated by the passage of the water of condensation for simultaneously changing the relative contacting faces of both said valves.

3. In a steam-trap, the combination, with a casing, of an initial valve, a follow-up valve having a valve-seat thereon for said initial valve, and a passage of comparatively small diameter communicating with said valve-seat, a valve-seat for said follow-up valve having a passage of comparatively large diameter communicating therewith, said follow-up valve being provided with a sidewardly-deflecting face for causing said follow-up valve to be rotated by the passage of the water of condensation for simultaneously changing the relative contacting faces on both said valves, and means operated by the water of condensation for automatically unseating said valves in the order named.

In witness whereof I have subscribed my name hereto in the presence of two subscribing witnesses.

ROBERT C. JOHNSTON.

Witnesses:
 CORDELIA O'HEARN,
 A. F. HERBSLEB.